April 29, 1969  L. MOSKOWITZ ET AL  3,441,834
TEMPERATURE COMPENSATION CIRCUIT FOR A DIFFERENTIAL TRANSFORMER
Filed Feb. 3, 1964
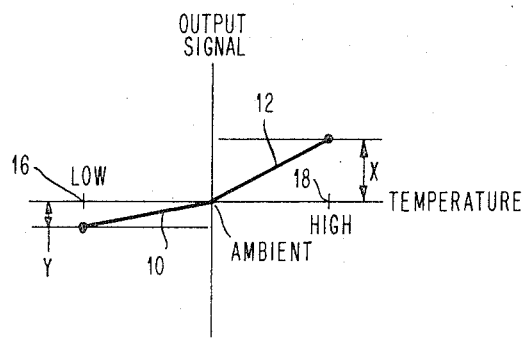
FIG. 1
PRIOR ART
FIG. 2
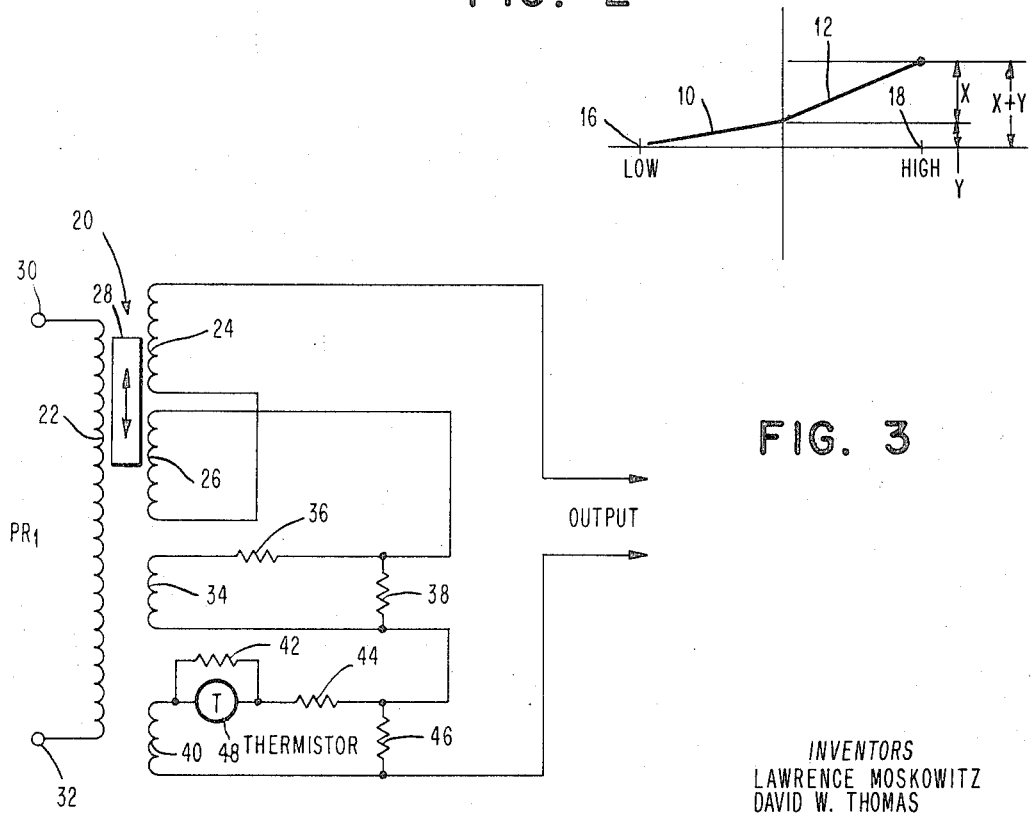
FIG. 3
INVENTORS
LAWRENCE MOSKOWITZ
DAVID W. THOMAS
BY *Edward M. Farrell*
ATTORNEY United States Patent Office 3,441,834
Patented Apr. 29, 1969

3,441,834
TEMPERATURE COMPENSATION CIRCUIT FOR A
DIFFERENTIAL TRANSFORMER
Lawrence Moskowitz, Camden, and David W. Thomas,
Palmyra, N.J., assignors to Schaevitz Engineering, a
corporation of New Jersey
Filed Feb. 3, 1964, Ser. No. 342,207
Int. Cl. H02p 13/04, 13/10; H02m 5/12
U.S. Cl. 323—48                                    3 Claims This invention relates to transducers, and more particularly to temperature compensation means for such transducers.

Differential transformers and other types of transducers have been used extensively for producing electrical signals proportional to the displacement of a body. For example, the differential transformer generally includes a movable core member adapted to be moved in accordance with a measured function. The movable core member is generally disposed between primary and secondary coils of the transformer and provides a path for magnetic flux linking the coils. The secondary coil of the transformer generally includes a pair of substantially similar windings connected in series opposition or bucking relationship.

When the primary coil of the transformer is energized with alternating current, voltages are induced in the two secondary coils. Since the two secondary coils are connected in series opposition, the two voltages induced in the two coils are opposite in phase. Therefore, the net output of the transformer is the difference between the voltages induced in the two secondary coils.

For one position of the core member, equal voltages are induced in the two secondary coils resulting in a net zero output voltage. When the core member is positioned for zero output volts, the core is said to be at the balance point or null position.

When the core member is moved from the null position, the voltage induced in the secondary coil towards which the core is moved increases, while the voltage induced in the secondary coil from which the core is moved decreases. These variations in induced voltages are due to the variations in the magnetic flux path between the primary coil and the respective secondary coils caused by the relative movement of the core member. When the core member is thus moved from its null position, a differential output voltage across the output circuit of the transformer results. With proper design, the output voltage from the transformer varies linearly with a change in the core position as long as the core is operating within its linear range. Motion of the core member in the opposite direction beyond the null position produces a similar voltage characteristic across the output circuit of the transformer, but with the phase shifted 180°.

In many differential transformers, the electrical output signal corresponding to zero of a null position varies with changes in temperature. When this occurs, the output signals from the differential transformer occurring at temperature extremes do not represent the true value of the input signals by some fixed amount. The variations in output signals resulting from variations in the temperature becomes increasingly more important for small input signals since the percentage of the input signal, with respect to the total signals increases proportionately.

The causes of the changes in output signals resulting from a zero shift, and not a change in scale factor, may be due to a mechanical distortion, a differential expansion or contraction of mechanical parts relating the differential transformer armature with respect to the transformer windings, or differentail expansion or contraction between symmetrical portions of the transformer or for other reasons. The direction and magnitude of the zero shifts may be random for each contributing factor. While the shifts may not be predeterminable in net effect, they may be repeatable as demonstrated by successive cycles of temperature excursions. Experience has generally indicated that the zero shifts are a continuous function of temperature, i.e., the shift will be in one direction for an increase in temperature about an ambient and in the opposite direction for a decrease in temperature about an ambient.

When repeatability and continuity of zero shifts with respect to temperature changes can be demonstrated, it is desirable to introduce compensation by means of elements external to the cause of this shift based on the possibility that any operation on a causitive element may alter the direction, magnitude and repeatability of its effect.

It is an object of this invention to provide a novel temperature compensation means.

It is a further object of this invention to provide temperature compensation for a transducer.

It is still a further object of this invention to provide temperature compensation in a differential transformer.

It is still a further object of this invention to provide temperature compensation means which may be readily incorporated into the design of conventional differential transformers.

In accordance with the present invention, a temperature compensation circuit for a transducer is provided. Means are provided so that all output signal variations resulting from a rise or fall in temperature are in a single direction or phase. Additional means are provided to cancel out the total variations resulting from changes in temperature.

Other objects and advantages of the present invention will be apparent and suggest themselves to those skilled in the art, from a reading of the following specification and claims, in conjunction with the accompanying drawing, in which:

FIGURE 1 is a chart illustrating output voltage changes resulting from temperature changes in a differential transformer;

FIGURE 2 is a chart illustrating output voltage changes resulting from temperature changes in a differential transformer embodying the present invention, wherein all the changes are of the same phase, and FIGURE 3 is a schematic diagram of a differential transformer with temperature compensation circuitry, in accordance with the present invention.

If a conventional differential transformer has a zero output signal at room temperature, or ambient, with an alternating signal applied to its primary winding and the movable core at a null position, the transformer may then be subjected to repeated cycles of temperature excursions between a low temperature limit and a high temperature limit. As a result of this, the amount of output signal variations resulting from temperature changes alone may be determined. Generally these signals are in opposite directions, dependent upon the direction of temperature change, as may be illustrated in FIGURE 1.

Referring particularly to FIGURE 1, there is illustrated a curve having portions 10 and 12 representing output voltages from a conventional differential transformer when such transformer is subjected to temperature variations. The portions 10 and 12 are of opposite phase with respect to a reference, which may, for example, be ambient.

Assume that the lowest temperature involved is represented by point 16, then the maximum amount of output signal at this point may be considered Y, which may be considered negative. If the highest temperature involved is represented by point 18, then the output signal at this point may be considered X which is in a positive direction. The total signal variations resulting from a temperature change from the lowest to the highest point may then be considered as $X+Y$.

It is noted that the variation in the output signal from a transducer resulting from temperature changes, as illustrated in FIGURE 1, are undesired changes and do not represent true information. As a result, it is desired to eliminate these changes resulting from temperature changes so that the output signal represents true information. In a differential transformer, this true information will be the degree of movement of a core providing the variable coupling between primary and secondary windings.

The first step towards eliminating changes in output signal resulting from temperature changes in carrying out the present invention is to provide means to shift the output signal so that the total output signal is in a single direction for the entire range of temperature changes, rather than in two directions or phases. The result of this shifting of output signal is illustrated in FIGURE 2.

Referring to FIGURE 2, it may be seen that the portions 10 and 12 are both of the same phase or in a positive direction. The manner of achieving this output signal will be described subsequently. For the present, it will be seen that at the low point 16 of temperature change, the output signal is zero. At ambient or room temperature, the output signal is equal to Y. At high point 18 of temperature change, the output signal is $X+Y$.

Referring particularly to FIGURE 3, in which one embodiment of the present invention is illustrated, a differential transformer 20 includes a primary winding 22 and a pair of secondary windings 24 and 26. The secondary windings 24 and 26 are connected in series opposition or bucking relationship with respect to each other. A movable core 28 provides a magnetic coupling path between the primary winding 22 and the secondary windings 24 and 26.

A source of alternating current is connected across the primary winding 22 through input terminals 30 and 32. In a conventional differential transformer of the type thus far described, the movable core 28 is generally first set in a null position so as to produce equal and opposite signals in the secondary windings 24 and 26 to produce a zero output voltage thereacross. As the movable core 28 is moved in either direction away from its null position, different voltages are produced across the windings 24 and 26. The amplitude and direction or phase of the combined voltage produced across the secondary windings 24 and 26 represent the degree and direction of movement of the movable core 28.

The differential transformer thus far described, without the temperature compensation features of the present invention yet to be described, may be affected by temperature changes to produce an output signal illustrated in FIGURE 1, even though the movable core 28 is not moved. It is seen that when the variations in output signals is added to the true information portion of the signal that the resulting output signals are erroneous due to the temperature changes. With very small changes in information, the changes in output signal with temperature changes are especially critical.

Now consider the means involving the present invention which are employed to change the output signal resulting from temperature variations (FIGURE 1) so that the entire range of signal variations resulting from temperature changes is of a single phase (FIGURE 2).

A first compensating winding 34 is disposed with respect to the primary winding 22 to have a voltage developed thereacross which is constant with respect to motion of the movable core and which is added to the output signal illustrated in FIGURE 1. A pair of resistors 36 and 38 of predetermined values are connected to the winding 34 to produce a voltage across the resistor 38 which is added to the voltage from the differential transformer 20 to shift the total output signal to produce the output signal illustrated in FIGURE 2. The value of the added voltage, developed across the resistor 38, is equal to Y.

A second compensating winding 40, also having constant output with respect to motion of the core, is also disposed with respect to the primary winding 22 to have a voltage developed thereacross. This second compensating winding is associated with resistors 42, 44 and 46. The resistor 42 is connected across a negative temperature coefficient resistor (sometimes called thermistor) 48. The winding 40 is connected so that the voltage induced therein is out of phase with the voltage induced in the winding 34.

The values of resistors 42, 44 and 46 and thermistor 48 are chosen so that the voltage developed across the resistor 46 is equal and opposite in phase to the voltage produced by the differential transformer 20 combined with the voltage across the resistor 38.

As is well known to those skilled in the art, a thermistor varies its resistance in accordance with variations in temperature. Thus as the temperature changes from its lowest point 16 to its highest point 18, the resistance of the thermistor 48 will vary accordingly so as to produce a voltage across the resistor 46 which is equal and opposite to the output voltage such as illustrated in FIGURE 2. Note that it isn't just the thermistor characteristic which provides the necessary voltages at the respective temperature extremes but this combination of 42, 48, 44 and 46. This is a simple thermistor network. More complicated networks incorporating additional thermistors and additional resistors are known in the art for matching any linear or non-linear change in voltage with temperature.

Thus it is seen that the compensating winding 34 and its associated circuitry is used to shift the output voltage resulting from temperature variations so that a single phase output is obtained. The second compensating winding 40 and its associated circuitry is then used to cancel out all the output voltage produced by temperature changes. Thus when an input signal is applied to the differential transformer 20, the output signal will represent true information devoid of any inaccuracies resulting from temperature changes.

While the embodiment illustrated requires two additional compensating windings associated with the differential transformer, the combined output signals therefrom should be constant despite movements of the core 28. One way of accomplishing this is to wind the compensating windings in a bifilar relationship with respect to the primary winding 22. Another way would be to have the compensating windings under or over the primary winding. Still another way would be to wind on or under the secondary windings close to the primary winding. Also, the additional compensating windings could be wound in sections bearing symmetrical relationship to the primary winding but connected in aiding relationship rather than opposed.

It is apparent that the present invention may take a wide variety of forms other than the embodiment illustrated in FIGURE 3.

The compensating windings may be made very small with respect to the main windings of the differential transformer. Thus, the windings may easily be added to many existing designs of conventional differential transformers.

What is claimed is:

1. In combination with a differential transformer for producing an output information signal in one of two directions and being subjected to temperature changes which tend to shift the zero reference voltage of said differential transformer and to change the output signal in either of two directions dependent upon said changes in temperature, a temperature compensation circuit for eliminating said shift in the zero voltage level caused by said temperature changes comprising first and second compensating windings associated with said differential transformer, a first resistive network connected across said first compensating winding to produce a signal so that the output signal produced by said differential transformer by temperature changes is of a single direction, said signal of a single direction representing the total signal variation from said differential transformer resulting from said temperature changes, and a second resistive network connected to said second compensating winding to cancel the portion of the output signal produced by said temperature changes.

2. In combination with a differential transformer, said differential transformer including a primary winding and a pair of secondary windings connected in series opposition for producing an output information signal in one of two directions dependent upon the direction of movement of a movable core element disposed between said primary and said secondary windings, said differential transformer being subjected to temperature changes which tend to change the output signal in either of two directions dependent upon the rise or fall in temperature, a temperature compensation circuit comprising first and second compensating windings associated with said differential transformer, means for connecting said first and second compensating windings to affect the output signal from said differential transformer, a resistor network connected across said first compensating winding to produce a signal so that the output signal produced by said differential transformer by temperature changes is in a single direction, said signal in a single direction representing the total signal variation from said differential transformer resulting from said temperature changes, a second resistive network connected across said second compensating winding to cancel any portion of the output signal produced by said temperature changes, and said second resistive network including a resistive element having a resistance variable in accordance with temperature changes.

3. In combination with a differential transformer, said differential transformer including a primary winding and a pair of secondary windings connected in series opposition for producing an output information signal in one of two directions dependent upon the direction of movement of a movable core element disposed between said primary and said secondary windings, said differential transformer being subjected to temperature changes over a range above and below ambient which tend to change the output signal in either of two directions dependent upon the rise or fall in temperature from ambient, a temperature compensation circuit comprising first and second compensating windings associated with said differential transformer, means for connecting said first and second compensating windings to said pair of secondary windings to affect the output signal from said differential transformer, a resistor network connected across said first compensating winding to produce a signal so that the output signal produced by said differential transformer by temperature changes is in a single direction whereby a zero output signal is present when said differential transformer is operating at one end of said temperature range, said signal in a single direction representing the total signal variation from said differential transformer resulting from said temperature changes, a second resistive network connected across said second compensating winding to cancel any portion of the output signal produced by said temperature changes, and said second resistive network including a resistive element having a resistance variable in accordance with temperature changes.

References Cited
UNITED STATES PATENTS

| | | | |
|---|---|---|---|
| 2,922,146 | 1/1960 | Smith et al. | 340—199 |
| 3,079,545 | 2/1963 | Kretsch et al. | 323—45 |
| 3,225,289 | 12/1965 | Koppel et al. | 323—51 |

JOHN F. COUCH, *Primary Examiner.*

A. D. PELLINEN, *Assistant Examiner.*

U.S. Cl. X.R.

323—51, 68; 340—199